June 18, 1968     A. C. BECK ET AL     3,388,957
GASEOUS LENSES EMPLOYING CATALYTIC COMBUSTION
Filed Nov. 23, 1964     2 Sheets-Sheet 1

INVENTORS A. C. BECK
G. E. CONKLIN
BY H. O. Wright
ATTORNEY

United States Patent Office 3,388,957
Patented June 18, 1968

3,388,957
GASEOUS LENSES EMPLOYING CATALYTIC
COMBUSTION
Alfred C. Beck, Red Bank, and Glenn E. Conklin, Middletown, N.J., assignors to Bell Telephone Laboratories, Incorporated, New York, N.Y., a corporation of New York
Filed Nov. 23, 1964, Ser. No. 413,244
7 Claims. (Cl. 350—179)

ABSTRACT OF THE DISCLOSURE

This application describes a thermal gaseous lens for guiding ultrahigh frequency electromagnetic wave energy. It is known that a focusing effect can be established by causing a transparent, cool gas to flow through a heated tube. In accordance with the present invention, heating is caused by the interaction of a chemically reactive gas, or mixture of gases, with a specific catalytic material placed about the periphery of the tube. In one embodiment of the invention, the catalytic material is located about the interior wall of the tube. In an alternate embodiment of the invention, the catalytic material is located about the exterior wall of the tube, and the chemically reactive gas is kept separate from the gas flowing within the tube.

---

This invention relates to the long distance transmission of ultrahigh frequency beams of electromagnetic wave energy. More particularly, it relates to means for reducing beam spreading and the scattering of rays of the beam.

Devices of the invention are related to numerous other devices directed toward the same or similar general objectives such as those disclosed and claimed in the following copending applications, all of which have been assigned to applicants' assignee: Ser. No. 347,166, filed Feb. 25, 1964, by D. W. Berreman; Ser. No. 353,689, filed Mar. 23, 1964, by D. W. Berreman; Ser. No. 357,424, filed Apr. 6, 1964, by K. B. McAfee, Jr.; Ser. No. 372,-992, filed June 5, 1964, by D. W. Berreman; Ser. No. 379,175, filed June 30, 1964, by D. W. Berreman and S. E. Miller; Ser. No. 379,112, filed June 30, 1964, by A. C. Beck, G. E. Conklin and A. R. Hutson; Ser. No. 382,873, filed July 15, 1964, by E. A. J. Marcatili; Ser. No. 384,510, filed July 22, 1964, by J. H. Whinnery; Ser. No. 385,739, filed July 28, 1964, by D. W. Berreman; and Ser. No. 402,170, filed Oct. 7, 1964, by D. W. Berreman, now Patent No. 3,355,235.

In the above-mentioned copending joint application of D. W. Berreman and S. E. Miller it is taught that a "gaseous lens" or focusing region can be established in a conduit by causing a laminar flow of cool gas to pass through a heated tube. In such an arrangement, along a heated section of the conduit the outer laminas of the flow of gas become heated while the more centrally located laminas remain at substantially the initial temperature of the flow thus establishing a radially varying temperature gradient varying from a relatively low temperature along the axis to a maximum at the inner periphery of the conduit.

Since the refractive index of a gas is, in general, under isobaric conditions, inversely proportional to its temperature, the above described arrangement establishes a radially varying gradient of the refractive index which varies from a maximum at the axis to a minimum at the inner periphery of the tube. This obviously produces a converging focusing effect upon a beam of ultrahigh frequency wave energy such as a laser beam or the like when the beam is transmitted along a path substantially concentric with the axis of the tube.

In accordance with the present invention, advantage is taken of the fact that when suitable mixtures of gases come in contact with specific catalytic materials oxidation or combustion takes place at a slow but sufficient rate to produce an appreciable rise in the temperature of the catalytic materials.

Illustrative structural embodiments utilizing this principle may be arrived at by lining sections of the interior of the conduit at appropriate intervals with a thin annular layer of a suitable catalytic material and passing a flow of an appropriate mixture of gases through the conduit. An alternative method is to make the sections of the conduit upon which the interior annular layer of catalytic material is deposited of a porous material and to inject an appropriate mixture of gases from the exterior of the conduit through the porous portions into contact with the catalytic layer. A still further alternative is to make the sections of conduit which are to be heated of material which is a good conductor of heat and to place the catalytic layer on the exterior of the section. It may then be enclosed in a chamber surrounding the section of conduit and a suitable quantity of an appropriate mixture of gases to cause heating of the catalytic material may be furnished to the exterior chamber.

In each case, the temperature of the coated sections of the conduit is raised, establishing a succession of "heated tubes" spaced at appropriate intervals along the conduit to create, in conjunction with a laminar flow of cooler gas through the conduit, convergent focusing regions or gaseous lenses substantially equivalent to those established by the structures of the above-mentioned copending joint application.

A principal object of the invention is, accordingly, to facilitate the periodic convergent focusing of an ultrahigh frequency beam of electromagnetic wave energy being transmitted along a central path through an enclosing conduit.

Other and further objects, features and advantages of the invention will become apparent from a perusal of the detailed description of illustrative embodiments given hereinunder, and from the appended claims, taken in conjunction with the accompanying drawing, in which:

Figure 1:
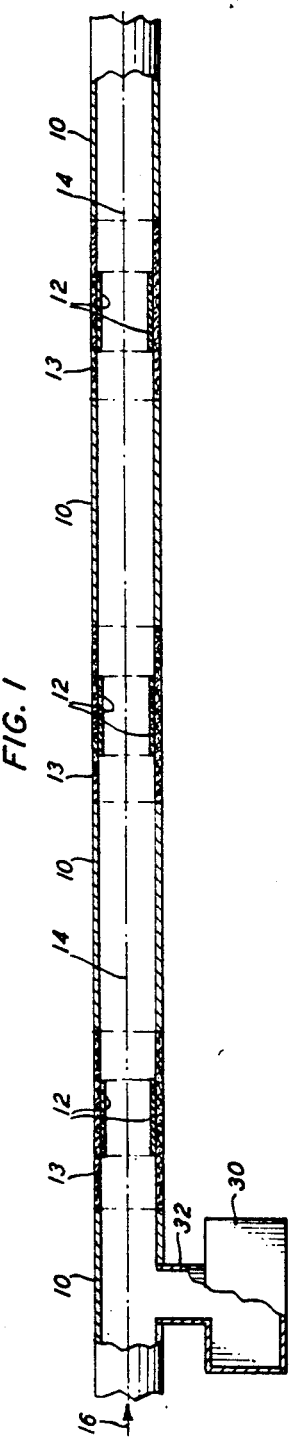
FIG. 1 illustrates diagrammatically a first embodiment of the principles of the invention.

In more detail in FIG. 1, a conduit 10 having a longitudinal axis 14 is shown. A laser beam 16 is to be transmitted along a path through the conduit substantially concentric with the axis 14. In practice, transmission over long distances such, for example, as between New York and Chicago or between New York and San Francisco is contemplated. It is, accordingly, important to prevent spreading of the laser beam and/or the scattering of the rays of such a beam.

This may be effected by periodically subjecting the beam to a convergent focusing effect at appropriate intervals as discussed in several of the above-mentioned copending applications. To effect such focusing, in the arrangement of FIG. 1, annular layers or coatings 12 of a suitable catalytic material are placed at appropriate intervals within conduit 10. The coating 12 should have a length parallel to axis 14 such that a prescribed degree of focusing is effected when the coating is heated. The interval between successive coatings is, for a straight section of conduit, approximately twice the focal length of the gaseous lens created by the heating of the coating.

Figure 4A:
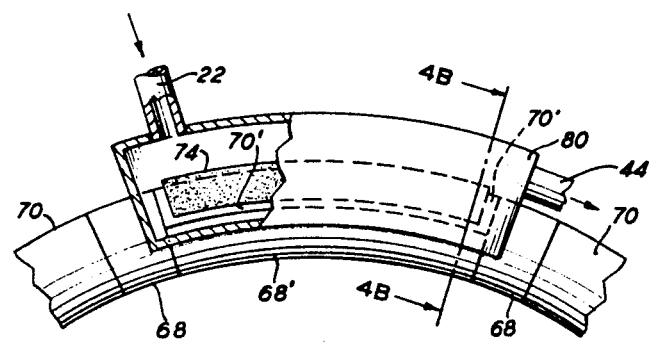
FIG. 4A illustrates diagrammatically the application of particular principles of the invention to produce a prismatic effect at curved sections of the conduit.
Figure 4B:
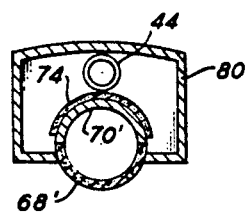
FIG. 4B is a transverse cross-sectional showing of the structure of FIG. 4A through plane 4B—4B.

For sections of the conduit which must be curved to effect changes in direction, closer spacing and shorter individual lens focal lengths may be advisable. A prismatic effect may also be obtained to assist in directing the beam through curved sections of the conduit by a coating employed to heat principally the outer portion of the curved section of conduit substantially as taught, for example, in the above-mentioned copending application of D. W. Berreman, Ser. No. 347,166, and as illustrated in FIGS. 4A and 4B of the drawing of the present application to be discussed in detail hereinunder. All changes in direction should normally be effected by curving the conduit at the greatest practicable radius.

Shorter focal lengths can be obtained by increasing the length of the coating and/or by increasing the temperature to which the coating is heated. In FIG. 1 the coating may, of course, be heated, as mentioned above, by passing a suitable mixture of gases through the conduit which reacts with the catalytic material to produce heating. The coatings 12 of FIG. 1 should be relatively thin in a radial direction so that a minimum reduction from the diameter of the uncoated conduit is effected and a smooth laminar flow of gas can be maintained through the conduit.

Suitable gas mixtures for heating coatings 12 should preferably contain oxygen or other suitable oxidant, a hydrocarbon or other suitable fuel, and preferably also an inert gas such as nitrogen to absorb any water condensation which occurs. More specifically, a mixture of oxygen and methane may be used with sufficient nitrogen to "dry" the products of combustion. Air may, of course, be employed to supply the oxygen and usually most of the nitrogen required.

Suitable catalytic materials include finely divided manganese dioxide, palladium or platinum. They should be employed in accordance with the technology of catalytic combustion of hydrocarbons or other fuel gases, well known and widely used by those skilled in this specific art.

A source of gas 30 introduces through connecting pipe 32 an appropriate quantity of a suitable mixture of gases to maintain an adequate flow of the same along conduit 10. The degree of heating, and hence of focusing, may be controlled by appropriate adjustment of the volume of the gases which act to cause heating of the coatings.

In FIG. 1, conduit 10 is, for sections between successive coatings 12, preferably of a good heat conducting material such, for example, as copper so that gas heated in passing through a coated portion will lose the heat added at one coating before reaching the next coating. However, at and for a short distance adjacent each coating 12 the conduit 13 is preferably made of a material having very poor heat conducting properties, such, for example, as asbestos fiber or the like, to avoid loss of heat from the coatings 12 to the conduit and its surroundings.

In the arrangement of FIG. 1, since a portion of the gas flowing through the conduit is utilized at each coating 12 to react with and heat the coating, it will be necessary at relatively long intervals to inject additional supplies of the reactant gas so employed into the stream of gas flowing through the conduit.

Figure 2:
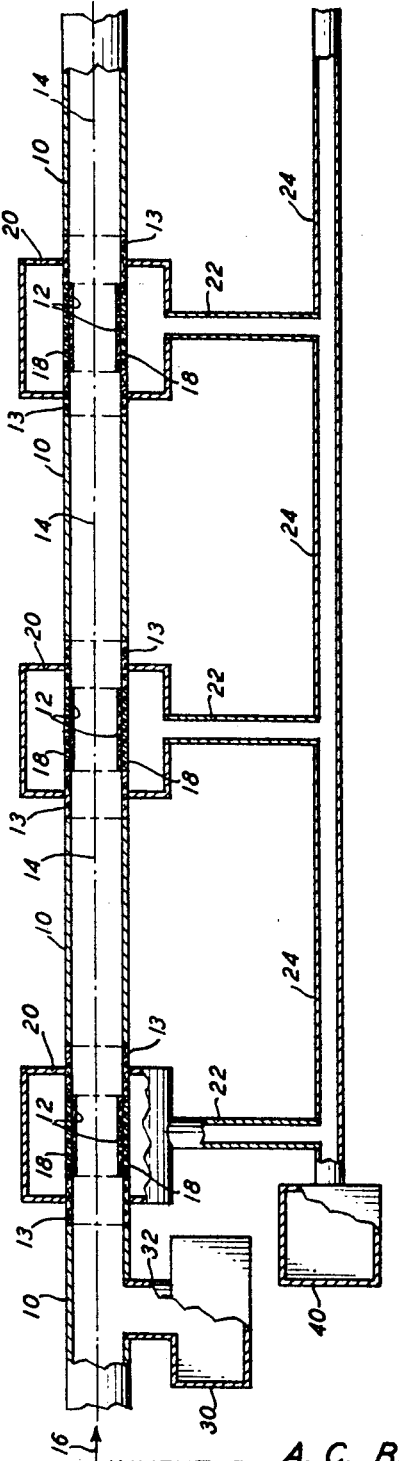
FIG. 2 illustrates diagrammatically a second embodiment of the principles of the invention.

Referring now to the arrangement exemplified by FIG. 2, at the position of each coating 12 a porous section 18 of the conduit is introduced and the gas which reacts with the catalytic material of coating 12 to heat it is introduced through the porous section 18. An annular enclosing chamber 20 enclosing each porous section 18 is connected through pipes 22 and 24 to a source 40 of appropriate gas at suitable pressure for the purpose of heating coatings 12 as above described. Enclosing chamber 20 and the adjacent short sections 13 of the conduit are preferably of a material which is substantially nonconductive to heat. The main stream or flow of gas parallel to axis 14 within conduit 10, in the case of the structure of FIG. 2, can accordingly be of an inert character such, for example, as carbon dioxide, nitrogen, argon, or the like. The quantity of gas introduced through each of the porous sections 18 is preferably restricted to that necessary to produce the prescribed degree of heating of the coatings 12 so that there is no appreciable accumulation of this active gas in the main flow of gas along conduit 10. The latter flow of gas is provided by source 30 through tube 32 and should, as mentioned above, preferably be substantially inert chemically.

Figure 3:
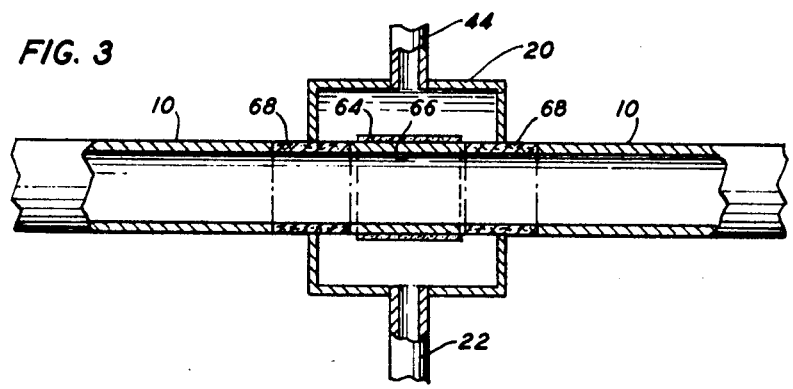
FIG. 3 illustrates diagrammatically a modification of the heating arrangements employed in the embodiment of FIG. 2.

In FIG. 3 a further arrangement of the invention for heating a section of the conduit to produce a gaseous lens focusing effect is illustrated. It differs from the corresponding arrangements shown in FIGS. 1 and 2 in that the annular coating 64 of catalytic material is on the outer surface of a section of conduit 66. Section 66 is preferably of copper or other material highly conductive to heat. On each side of section 66 a further section of conduit 68 of a material which is substantially nonconductive to heat such as asbestos fiber or the like is employed to join section 66 to left and right sections of conduit 10, as shown. Conduit 10, as mentioned above, is preferably of a material such as copper which is highly conductive to heat.

Section 66 bearing annular coating 64 on its outer surface is enclosed by annular chamber 20, as for the arrangement of FIG. 2. A pipe 22 serves to connect chamber 20 to a source of gas in the general manner indicated in FIG. 2. A small venting means 44 is provided for chamber 20 opposite input pipe 22 to insure an adequate flow of active gas around coating 64. With the arrangement of FIG. 3, none of the gas employed in chamber 20 to heat the annular catalytic coating 64 can enter conduit 10 and hence no problem of contaminating the laminar flow of gas in conduit 10 can arise with this arrangement.

In FIGS. 4A and 4B an arrangement of the invention for inducing a prismatic effect to assist in directing the beam to follow the curvature of conduit section 70 is illustrated. A catalytic coating 74 is placed on the outer upper side of the curved conduit section 70 substantially as shown. Coating 74 is in turn enclosed in an enclosure 80 of a material substantially nonconductive to heat. A suitable gas for heating coating 74 is introduced through pipe 22 at one end of enclosure 80 and a small venting means 44 is provided at the opposite end to insure an adequate flow of gas over coating 74. The portion of conduit 70 designated 70' and covered by coating 74 should be of a material highly conductive to heat and adjacent sections 68 and 68' of nonheat-conducting material may be employed substantially as shown in FIG. 3 to join the main conduit 70. Since the arrangement described will result in reducing the refractive indices of the upper outer laminas of the laminar flow of gas through the curved portion, it is apparent that the arrangement illustrated in FIGS. 4A and 4B will have a prismatic effect tending to bend the energy rays in the direction of the curvature of the conduit.

Numerous and varied modifications and rearrangements of the above described illustrative embodiments of the invention within the spirit and scope of the principles thereof will readily occur to those skilled in the art. Accordingly, it is to be understood that the described embodiments are illustrative only and not to be interpreted as limiting the invention.

What is claimed is:

1. A transmission system for guiding a beam of ultra-high frequency electromagnetic wave energy, comprising:
   a hollow, segmented conduit, made of a thermally conductive material, defining an enclosed wavepath for said beam;

sections of hollow tubing extending between adjacent segments of said conduit;

a coating of a catalytic material located upon the inner surface of said tubing and thermally insulated from said conduit;

means for causing a gas that is transparent to said beam to flow through said conduit and past said coating;

said flow of gas including a component that is chemically reactive with said catalytic material, causing heating of said coating and, thereby, producing a radially varying temperature gradient across the gas flowing past said coating.

2. The system according to claim 1 wherein said coating is an annular coating.

3. A transmission system for guiding a beam of ultrahigh frequency electromagnetic wave energy, comprising:

a hollow, segmented conduit, made of thermally conductive material, defining an enclosed wavepath for said beam;

sections of hollow tubing extending between adjacent segments of said conduit;

a coating of a catalytic material located upon a surface of said tubing and thermally insulated from said conduit;

means for causing a first gas that is transparent to said beam to flow through said conduit and past said coating;

and means for causing a second gas that is chemically reactive with said catalytic material to come in contact with said coating, causing heating of said coating and, thereby, producing a radially varying temperature gradient across the gas flowing between segments of said conduit.

4. The system according to claim 3 wherein;
said tubing is porous and said coating is located on the interior surface of said porous tubing:
and wherein said second gas is introduced through said porous tubing.

5. The system according to claim 3 wherein;
said hollow tubing is made of thermally conductive material and said coating is located on the exterior surface of said hollow tubing;
wherein said second gas flows about said tubing;
and wherein thermally insulating means are located between said tubing and adjacent segments of conduit.

6. The system according to claim 3 wherein said coating is an annular coating.

7. The system according to claim 3 wherein said coating extends only partially about said hollow tubing.

References Cited

UNITED STATES PATENTS 2,996,062   8/1961   Weiss _____ 126—208

DAVID H. RUBIN, *Primary Examiner.*

JEWELL H. PEDERSEN, *Examiner.*

R. J. STERN, *Assistant Examiner.*